United States Patent [19]
Dumont

[11] 3,831,818
[45] Aug. 27, 1974

[54] FERTILIZER DISTRIBUTOR
[75] Inventor: Jacques Dumont, Saverne, France
[73] Assignee: Kuhn S.A., Saverne, France
[22] Filed: May 3, 1973
[21] Appl. No.: 356,794

[30] Foreign Application Priority Data
May 15, 1972 France .......................... 72.17964

[52] U.S. Cl. ............... 222/145, 222/185, 222/241, 111/6, 259/8
[51] Int. Cl. ............................................. B67d 5/60
[58] Field of Search ........... 222/242, 145, 239, 241, 222/240, 181, 185, 176, 136, 273, 271, 193, 190; 239/662, 676; 111/10, 6, 7, 34; 259/23, 24, 7, 8

[56] References Cited
UNITED STATES PATENTS
471,624   3/1892   Shuler ................................. 111/7
1,629,200  5/1927   Buhtz .................................. 259/7
2,164,483  7/1939   Watson et al. ................... 222/193 X FOREIGN PATENTS OR APPLICATIONS
1,089,302  11/1967  Great Britain ..................... 239/668

*Primary Examiner*—Richard A. Schacher
*Assistant Examiner*—James M. Slattery
*Attorney, Agent, or Firm*—Young & Thompson

[57] ABSTRACT

The disclosure is of a fertilizer distribution device comprising a fertilizer-holding hopper, a reservoir for liquid, a bell-mouthed-conduit for leading the liquid inside and close to the bottom of the hopper, a power-driven rotary stirrer extending up into the bell mouth of the conduit, a clearing spiral on the stirrer for drawing wetted fertilizer out of the said bell mouth, openable shutters controlling openings for the discharge of wetted fertilizer, and means for manually controlling the said shutters and the rate of flow of liquid.

11 Claims, 6 Drawing Figures

FERTILIZER DISTRIBUTOR

INTRODUCTION AND BACKGROUND OF THE INVENTION

The present invention relates to distributors comprising hoppers able to serve for distributing granular and pulverulent fertilizers.

The known distributors of this kind generally give entire satisfaction for the distribution of granular fertilizers, but they present disadvantages for the distribution of pulverulent fertilizers such as scoria.

This invention resides in an improvement for the distribution of pulverulent fertilizer. Notably this improvement has the advantage of being applicable equally well to future constructions and to machines which are already in service.

In order to obtain a regular distribution of pulverulent fertilizers, over a substantial working width and without giving rise to troublesome dust during the distribution it is desirable to mix the fertilizer in an adequate manner with a volume of liquid such as water.

In the known distributors it is necessary to effect numerous operations prior to the distribution, notably:

to dispose some portions of the fertilizer at the bottom of the hopper to add approximately one litre of water to introduce into the hopper half a sack of fertilizer to add approximately two litres of water whilst taking care to create in the centre of the product a crater destined to receive the water and taking care not to wet the walls to add the remainder of the first sack into the hopper to add approximately two litres of water into the small crater which will have been formed to empty an entire sack of product into the hopper to introduce 4 to 5 litres of water to place the stirrer in the axis of the hopper and maintain it in this position to add a sack of 50 kg of fertilizer to introduce between 3 and 5 litres of water whilst always taking care not to wet the walls to proceed in a similar manner for the subsequent sacks to make the apparatus rotate for approximately one minute at a speed of about 540 rpm by means of the power take-off in order to obtain a good mixture.

Moreover, the large dimension of the stirrers for pulverulent fertilizer provided in the known distributors involve a substantial power for the driving of these latter.

The present invention has for one object to obviate these disadvantages.

BRIEF SUMMARY OF THE INVENTION

According to this invention the upper part of the stirrer penetrates at least partially into the lower portion of a conduit member for supplying liquid towards the bottom of the hopper.

FURTHER DESCRIPTION AND ADVANTAGES OF THE INVENTION

According to another feature of the invention the upper portion of the stirrer is provided with a clearing spiral; this spiral makes it possible to obtain a good distribution of liquid around the stirrer and to avoid a disadvantageous clogging of the orifice of the conduit member for the supply of the liquid.

Other features and advantages appear from the description and the accompanying drawings, which represent in partial views non-limitative forms of embodiment according to the invention.

BRIEF DESCRIPTION OF THE VIEWS IN THE DRAWINGS

In the said drawings

DETAILED DESCRIPTION OF THE PREFERRED EMBODIMENTS

Figure 1:
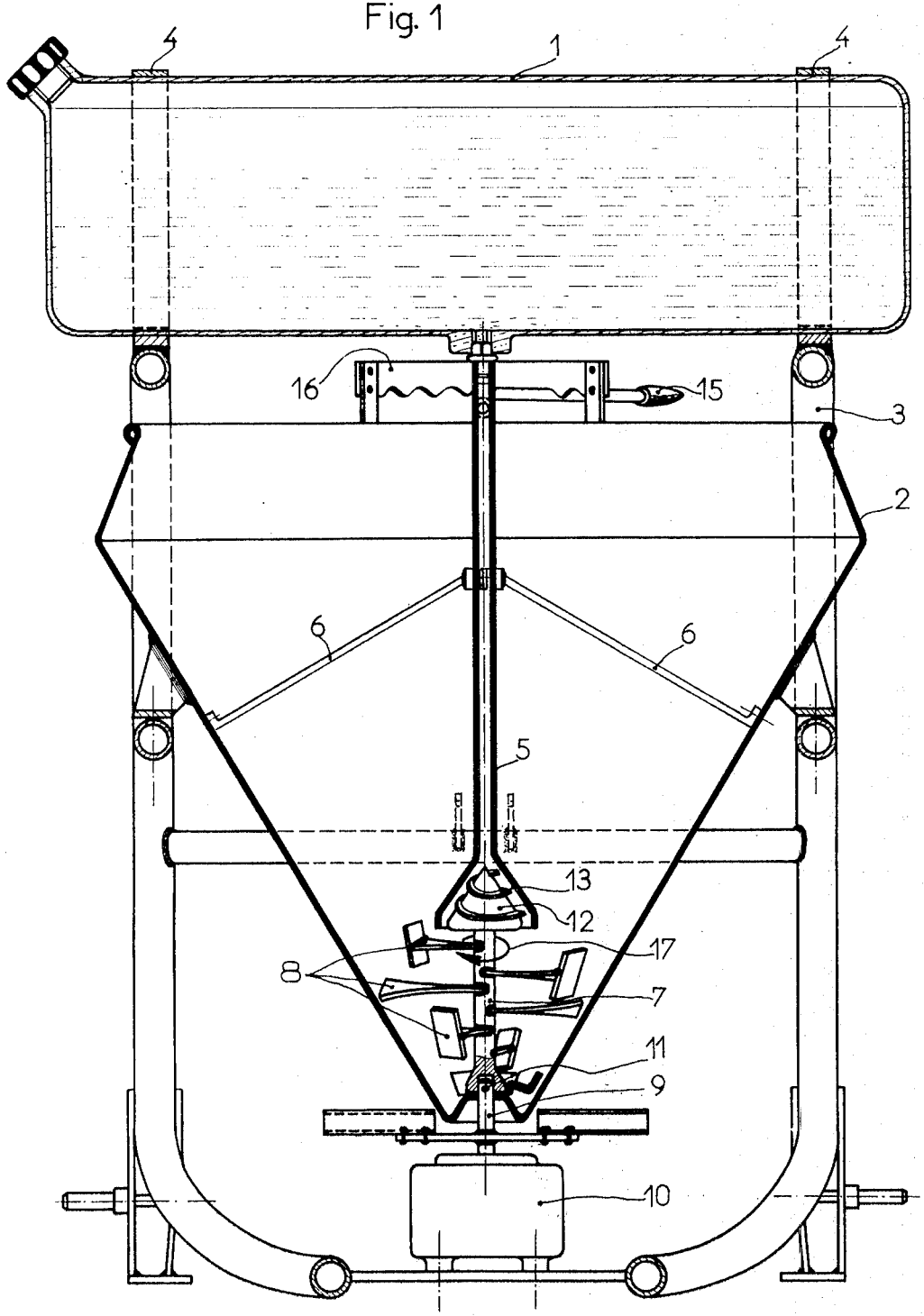
FIG. 1 is a diagrammatic front view in section of a distributor
Figure 2:
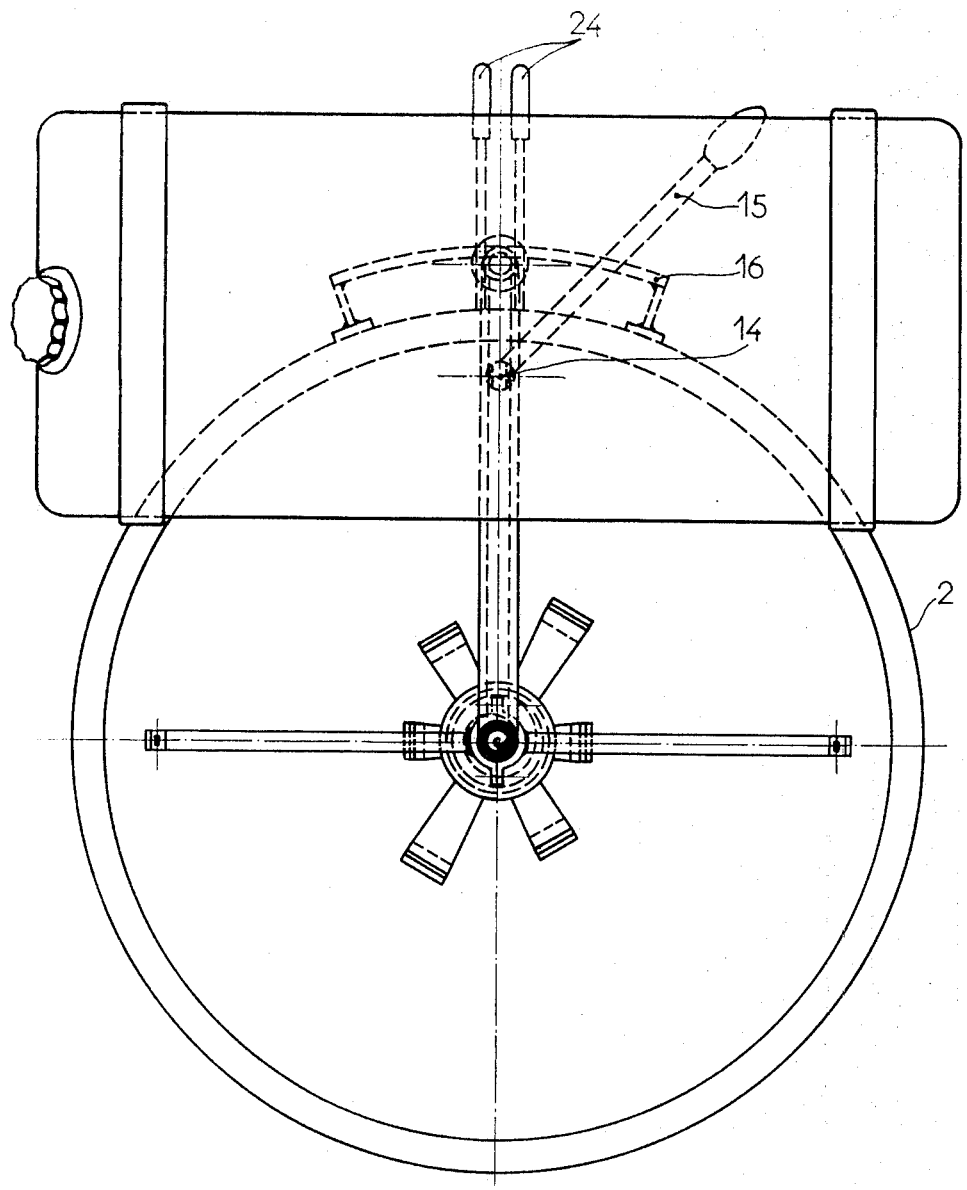
FIG. 2 is a view from above corresponding to FIG. 1

In the manner of construction represented in FIGS. 1 and 2 the distributor is carried by the three-point attachment system of an agricultural tractor (not shown).

A reservoir 1 placed above the hopper 2 is secured to a frame 3 by means of two straps 4.

The said reservoir 1 is provided with a conduit member 5 for the supply of liquid towards the bottom of the hopper 2, which conduit member 5 is widened at its lower portion. Stays 6 maintain the conduit member 5 at the middle of the hopper 1.

A stirrer 7 provided with mixing paddles 8 is rigidly secured to the output shaft 9 of the gear-box 10 by means of a bayonet type fastening 11.

The upper portion 12 of this stirrer 7 is conical and is provided with a clearing spiral 13.

This upper portion 12 of the stirrer 7 penetrates at least partially into the lower portion of the liquid supply conduit member 5.

A valve 14 arranged in the liquid supply conduit member 5 is actuated by means of a resilient lever 15. A positioning sector 16 secured to the hopper 2 makes it possible to maintain the lever 15 in the desired position having regard to the required flow of liquid.

Figure 5:
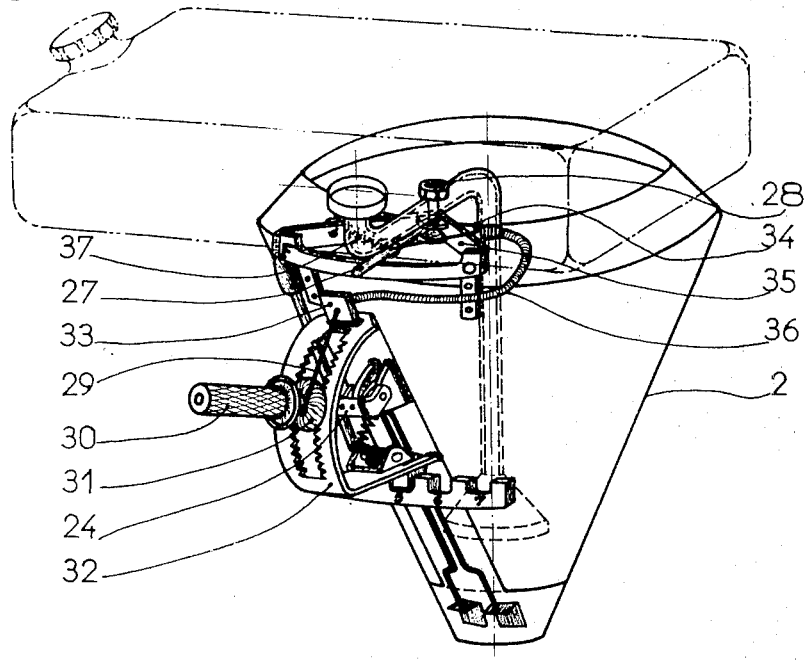
FIGS. 5 and 6 are views in perspective of distributors which are further modifications of construction.
Figure 6:
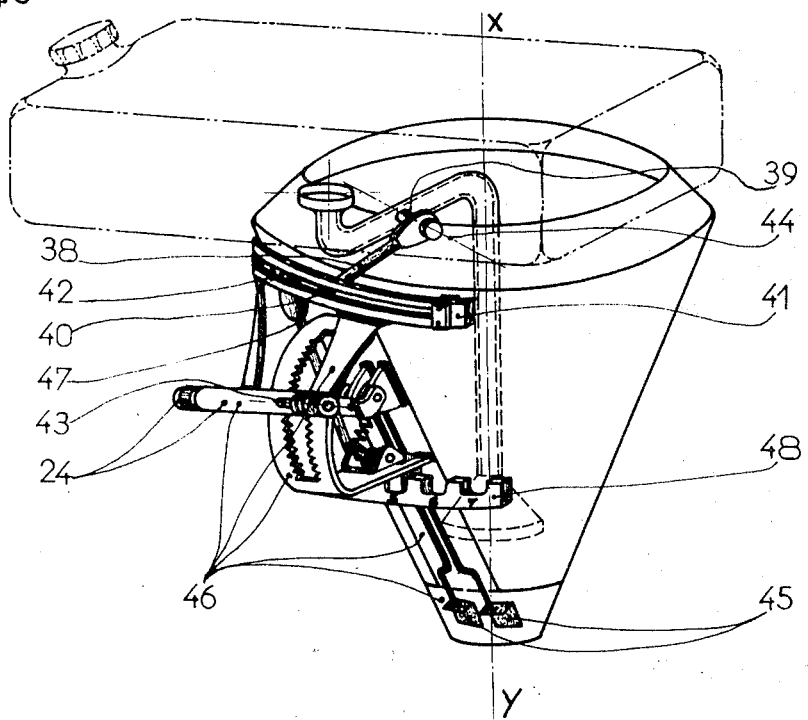

In the first manner of construction the flow of liquid is not synchronised with the lever 24 (FIGS. 4, 5 and 6) for controlling the opening of the shutters 45 (FIG. 6).

According to another feature of the invention the reservoir 1 can be made of translucent material or carry a transparent tube visible from the tractor seat with a view to being able to supervise the level of the contents of the reservoir continuously.

Figure 3:
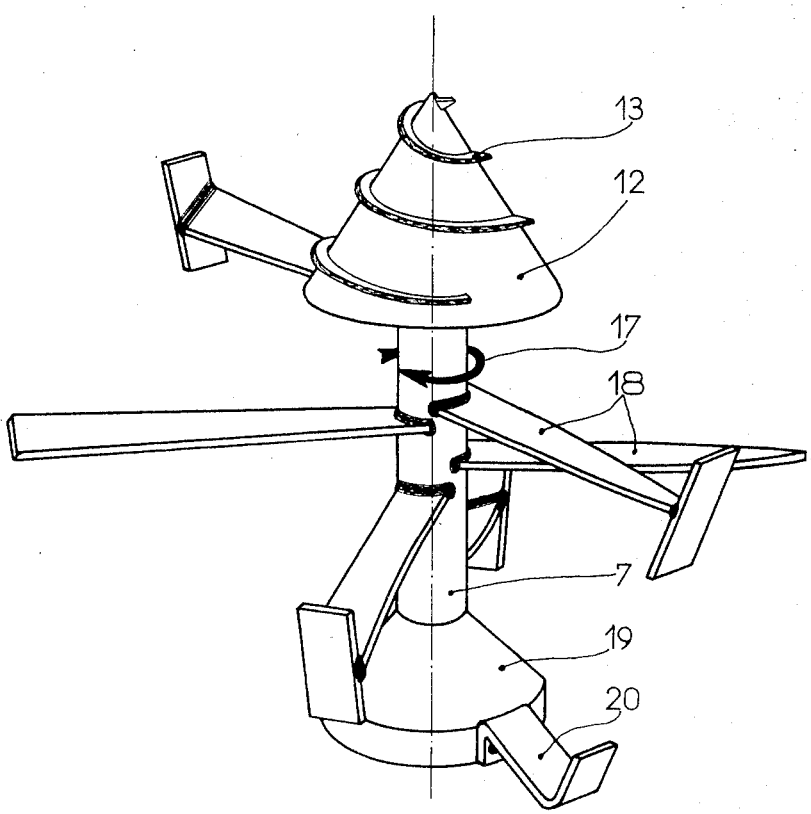
FIG. 3 is a perspective view of a stirrer

From FIG. 3 it appears that the stirrer comprises:

a central portion driven in rotation in the direction of the arrow 17, upon the periphery of which central portion there are welded various paddles 18, a conical lower part 19 mating with the driving shaft, provided with a scraper segment 20, and an upper portion 12 in the form of a cone surrounded by a clearing spiral 13.

The direction of winding of the clearing spiral 13 on the conical part 12 makes it possible to obtain a good distribution of the liquid around the stirrer and makes it possible to avoid an undesirable clogging of the widened orifice of the liquid supply conduit member 5.

Likewise, the direction of impulsion of particular paddles 18 makes it possible to guide the mixture towards the bottom of the hopper 2. It goes without saying that the fertilizer in the upper portion of the hopper 2 descends by the force of gravity in proportion to the distribution.

Thus, by virtue of this invention,
the mixture to be distributed is obtained very rapidly the power required to obtain this mixture is small by virtue of the fact that the mixing is effected in the bottom portion of the hopper 2 and
the risk of deformation of the stirrer is likewise small by virtue of its small height.

It is to be noted that the portion 12 provided with a clearing spiral 13 can be domed or cylindrical or of any other suitable shape without departing from the scope of the invention.

Figure 4:
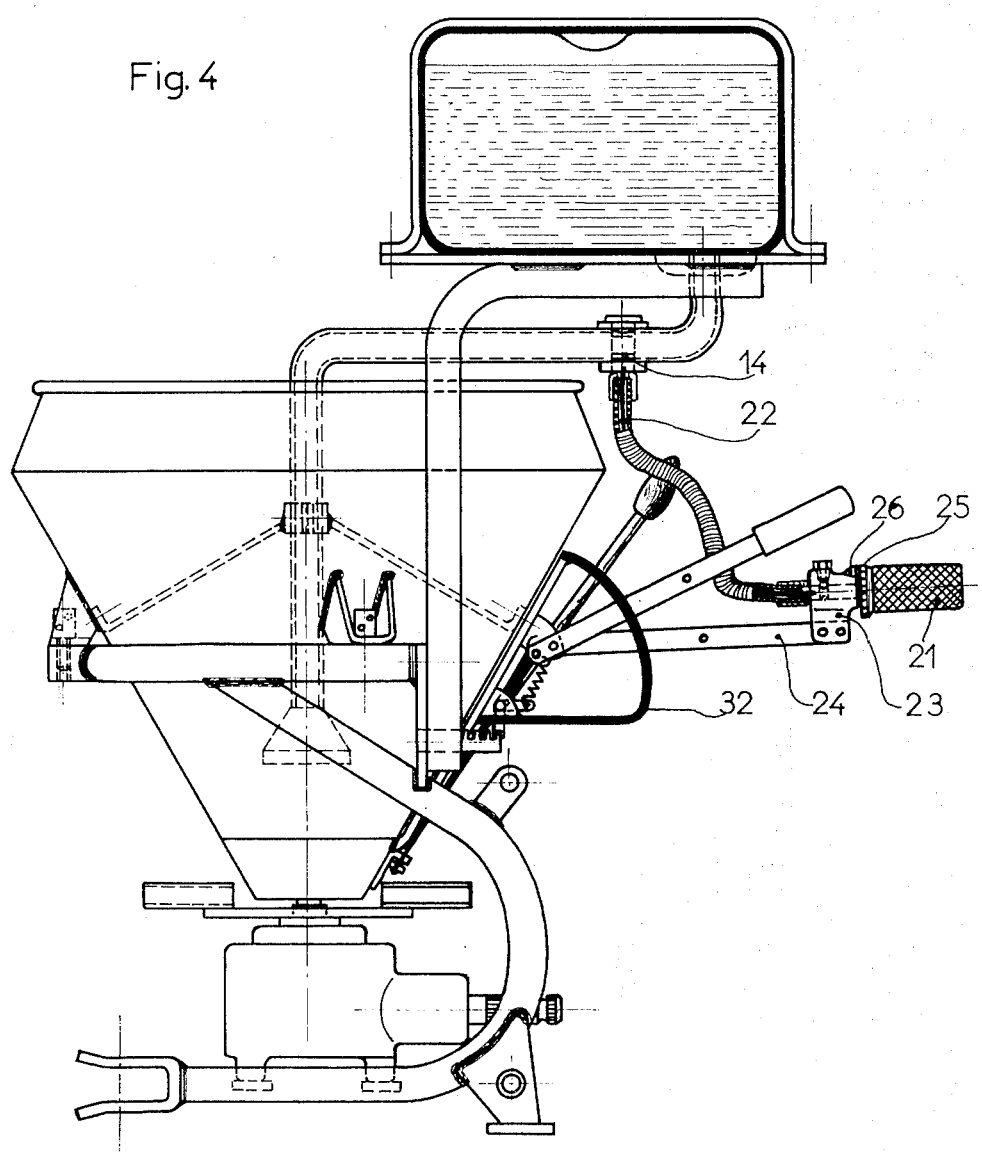
FIG. 4 is a diagrammatic elevation of a distributor, showing a modification of construction

In the manner of construction represented in FIG. 4 the valve 14 is made fast in rotation with a handle 21 by means of a flexible cable 22 surrounded by a protective sleeve. The said handle 21 is connected for rotation to a bracket 23 secured to a lever 24 for controlling the opening of the shutter 45 (FIG. 6).

A graduated collar 25 secured to the handle 21 and an index pointer 26 secured to the bracket 23 render possible the regulation and the precise controlling of the flow of liquid.

In this manner of construction the control of the opening of the shutters and the control of the supply of liquid are obtained by the same handle 21.

Thus these two controls may be synchronised or not.

In the manner of construction represented in FIG. 5 of lever 27 is made rigid with the valve 28. By means of a cable 29 this lever 27 is connected to a handle 30 provided with a rotary element 31, which handle 30 is connected for rotation on a lever 24 for controlling the opening of the shutters 45. The said control lever 24 can be displaced relative to a sector 32. A lug 33 is secured to this sector 32. A second lug 34 is secured to a strut 35 fixed to the hopper 2. The portion of the cable 29 extending between the two lugs 33 and 34 is enclosed by a sleeve 36 held stationary at its two extremities by the said lugs.

Thus when the control lever 24 is moved downwardly in order to open the shutters 45 the cable 29 displaces the lever 27 in the direction "o" and by virtue thereof opens the valve 28.

If the control lever 24 is moved upwardly in order to reclose the shutters 45 a tension spring 37 draws the lever 27 in the direction "F" corresponding to the direction for closing the valve 28.

In this manner of construction the controlling of the opening of the shutters 45 and the controlling of the supply of liquid are obtained by the same handle 30.

Thus, as in the preceding example, these two controls may be synchronised or not.

In the manner of construction represented in FIG. 6 a lever 38 is connected to the valve 39. This lever 38 is provided with a slide piece 40 lodged in a slideway 41 having a slot 42 with a spherical profile. This slideway 41 is articulated upon a pivot pin 43 traversing the two levers 24 for controlling the opening of the shutters 45.

Thus, when the levers 24 are moved downwardly in order to open the shutters 45 the slideway 41 displaces the lever 38 downwardly about the axis 44 and thereby opens the valve 39. When the control levers 24 are moved upwardly in order to reclose the shutters 45, the lever 38 is likewise moved upwardly in the direction for closing the valve 39.

It is to be noted that if the control arrangement 46 is displaced around the axis x–y of the hopper 2 by means of the lever 47 in order to obtain a modification of the orientation of the projected sheet of fertiliser, the position of the control lever 38 of the valve 39 is not changed. In practice the length of the slot 42 of the slideway 41 corresponds to the length of the sector 48.

From the example of embodiment represented in FIG. 6 it appears that the control of the opening of the shutters 45 and the control of the supply of liquid are synchronised.

Moreover this synchronisation can be corrected by means of an intermediate piece (not shown) able to slide in the slot 42 and having a slot perpendicular to the slot 42, in which perpendicular slot there is lodged the element 40 of the lever 38.

In this instance the blocking of the element 40 of the lever 38 can be effected by simple constriction of the perpendicular slot. Distributors according to the invention can be towed or mounted or otherwise transported.

What is claimed is:

1. A fertilizer distributor comprising a hopper for solid fertilizer, a stirrer mounted for rotation in the lower portion of the hopper, means for rotating said stirrer, a reservoir for liquid, and a conduit for said liquid extending within the hopper downwardly from said reservoir and terminating in a lower portion of the hopper, an upwardly-directed portion of said stirrer penetrating at least partially into the lower end of said conduit for liquid and rotating in said lower end thereby to clear said lower end of said conduit of solid fertilizer from the hopper upon rotation of the stirrer.

2. A distributor as claimed in claim 1, in which said upwardly-directed portion of the stirrer has a clearing spiral thereon.

3. A distributor as claimed in claim 2, in which said lower end of said conduit widens progressively downwardly outwardly.

4. A distributor as claimed in claim 3, in which said lower end of said conduit and said clearing spiral mate with each other.

5. A distributor as claimed in claim 1, and shutters for controlling the discharge of fertilizer and liquid from the bottom of the hopper, and means to control the supply of liquid through said conduit independent of said shutters.

6. A distributor as claimed in claim 4, and a valve for controlling the supply of said liquid, and a control lever for said valve.

7. A distributor as claimed in claim 6, and a positioning sector for selectively positioning said control lever.

8. A distributor as claimed in claim 1, and a control member for controlling both the supply of said liquid and the discharge of fertilizer from the bottom of said hopper.

9. A distributor as claimed in claim 8, said control member comprising a control handle for rotating a flexible cable to operate a valve to control said supply of liquid, and for swinging a control lever to control shutters at the bottom of said hopper to regulate the discharge of fertilizer from the bottom of the hopper.

10. A distributor as claimed in claim 8, said control member being connected by a flexible cable to a rotatable winding element secured to a lever for controlling the opening of shutters at the bottom of said hopper to control the discharge of fertilizer from the hopper.

11. A distributor as claimed in claim 1, said stirrer rotating about a vertical axis and having stirring members that project outwardly from said axis into the bottom of the hopper below said lower end of said conduit.

* * * * *